United States Patent
Kume et al.

(10) Patent No.: US 7,411,617 B2
(45) Date of Patent: Aug. 12, 2008

(54) IMAGE PROCESSING APPARATUS, IMAGE PROCESSING METHOD, RECORDING MEDIUM, AND PROGRAM

(75) Inventors: Tsutomu Kume, Ibaraki (JP); Shinya Ishii, Kanagawa (JP); Tokuichiro Yamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 967 days.

(21) Appl. No.: 10/642,925

(22) Filed: Aug. 18, 2003

(65) Prior Publication Data

US 2004/0119847 A1    Jun. 24, 2004

(30) Foreign Application Priority Data

Aug. 16, 2002  (JP)  ............... 2002-237292

(51) Int. Cl.
*H04N 7/01* (2006.01)
(52) U.S. Cl. .................. 348/239; 348/443; 348/444; 348/445; 386/131
(58) Field of Classification Search ......... 348/443–445, 348/239; 386/131
See application file for complete search history.

(56) References Cited

U.S. PATENT DOCUMENTS

| | | | | |
|---|---|---|---|---|
| 5,450,140 A | * | 9/1995 | Washino | 348/722 |
| 5,999,220 A | * | 12/1999 | Washino | 348/441 |
| 6,327,000 B1 | * | 12/2001 | Auld et al. | 348/441 |
| 6,445,419 B1 | * | 9/2002 | Sanpei | 348/443 |
| 6,476,852 B1 | * | 11/2002 | Okada | 348/65 |
| 7,103,260 B1 | * | 9/2006 | Hinson | 386/52 |
| 7,142,251 B2 | * | 11/2006 | Sha et al. | 348/557 |
| 2001/0050722 A1 | * | 12/2001 | Tachibana | 348/459 |
| 2002/0118296 A1 | * | 8/2002 | Schwab et al. | 348/441 |
| 2002/0136540 A1 | * | 9/2002 | Adams et al. | 386/125 |
| 2004/0081437 A1 | | 4/2004 | Asada et al. | |

FOREIGN PATENT DOCUMENTS

| | | |
|---|---|---|
| EP | 1 006 723 | 6/2000 |
| JP | 5 122711 | 5/1993 |
| JP | 6 105204 | 4/1994 |
| JP | 8 154201 | 6/1996 |
| JP | 10 23318 | 1/1998 |
| JP | 11 177845 | 7/1999 |

(Continued)

*Primary Examiner*—Nhan T. Tran
*Assistant Examiner*—Pritham Prabhakher
(74) *Attorney, Agent, or Firm*—Frommer Lawrence & Haug LLP; William S. Frommer; Thomas F. Presson

(57) ABSTRACT

In image-data recording processing performed when a video output conforms to the PAL system, a display-signal processing section receives image data having a frame rate of 30 Hz recorded in a memory, through a bus, converts the image data to image data having an NTSC frame rate of 29.97 Hz by a frame-rate conversion method in which thinning out is performed according to the ratio of frame rates, and outputs it to a display section and a codec-IC interface. The display-signal processing section also converts to image data having a PAL frame rate of 25 Hz, and outputs it to a video-output interface. In other words, image data is processed at a frame rate not related to the output, and then converted to image data having a frame rate suited for the output, and output. This invention can be used in digital cameras.

12 Claims, 11 Drawing Sheets

FOREIGN PATENT DOCUMENTS

| | | |
|---|---|---|
| JP | 2000 92490 | 3/2000 |
| JP | 2000 165821 | 6/2000 |
| JP | 2001 501781 | 2/2001 |
| JP | 2001 519122 | 10/2001 |
| JP | 2002 142151 | 5/2002 |
| WO | WO 99 57897 | 11/1999 |
| WO | WO 02 39737 | 5/2002 |

* cited by examiner

FIG. 7

| INPUT | | | OUTPUT |
|---|---|---|---|
| EN | CLK | D | OUT |
| L | × | × | Q0 |
| H | L | × | Q |
| H | H | × | Q |
| H | ↑ | L | L |
| H | ↑ | H | H |

FIG. 8

| INPUT | | | OUTPUT |
|---|---|---|---|
| s | 0 | 1 | OUT |
| L | L | × | L |
| L | H | × | H |
| H | × | L | L |
| H | × | H | H |

FIG. 9

| VIDEO MODE | CODEC MODE | EN1 | EN2 | EN3 | CONT1 | CONT2 |
|---|---|---|---|---|---|---|
| NTSC | NTSC | 30Hz | NTSC FRAME | NTSC FRAME | 0 | — |
| PAL | NTSC | 30Hz | PAL FRAME | NTSC FRAME | 0 | — |
| NTSC | PAL | 30Hz | NTSC FRAME | PAL FRAME | 0 | — |
| PAL | PAL | 30Hz | PAL FRAME | PAL FRAME | 0 | — |

FIG. 10

| VIDEO MODE | CODEC MODE | EN1 | EN2 | EN3 | CONT1 | CONT2 |
|---|---|---|---|---|---|---|
| NTSC | NTSC | 30Hz | NTSC FRAME | NTSC FRAME | 1 | 0 |
| PAL | NTSC | 30Hz | PAL FRAME | NTSC FRAME | 1 | 1 |
| NTSC | PAL | 30Hz | NTSC FRAME | PAL FRAME | 1 | 1 |
| PAL | PAL | 30Hz | PAL FRAME | PAL FRAME | 1 | 0 |

IMAGE PROCESSING APPARATUS, IMAGE PROCESSING METHOD, RECORDING MEDIUM, AND PROGRAM

BACKGROUND OF THE INVENTION

1. Field of the Invention

The present invention relates to image processing apparatuses, image processing methods, recording media, and programs, and more particularly, to an image processing apparatus, an image processing method, a recording medium, and a program, suited to cases in which images are output in a predetermined format.

2. Description of the Related Art

In digital cameras (digital still cameras, digital video cameras, and digital cameras which can capture still pictures and moving pictures), liquid-crystal viewfinders are used in stead of optical viewfinders to determine images to be captured. The digital cameras are provided with a video output terminal for outputting image data recorded inside the cameras to an external display unit, such as a television receiver, to display captured images.

Video output formats include the format of the National Television System Committee (NTSC) system and the format of the Phase Alternating Line (PAL) system. The NTSC system is a color television signal system standardized in 1953, has 525 (60 fields) scanning lines, a frame rate of 29.97 frames/second, and an aspect ratio of 3:4, and is mainly used in the United States of America and Japan. The PAL system is a color television signal system proposed in 1962 in West Germany, has 625 (50 fields) scanning lines, a frame rate of 25 frames/second, and an aspect ratio of 3:4, and is mainly used in Western European countries except France.

Since the whole processing of conventional digital cameras is driven by a reference clock signal conforming to the frame rate of the NTSC or PAL system according to the video output format, images in the NTSC or PAL system are displayed on the liquid-crystal viewfinders.

FIG. 1 is a block diagram showing the structure of a conventional digital camera 1. In the figure, solid lines indicate image signal transfer, dotted lines indicate control-signal transfer, one-dot chain lines indicate code-signal transfer, and two-dot chain lines indicate synchronization-signal transfer.

An image signal captured by a charge coupled device (CCD) camera section 11 is converted to a digital signal by an A/D conversion section 12, and input to a signal processing section 13. The signal processing section 13 applies processing, such as gamma processing and processing for converting an RGB signal to Y/Cb/Cr signals, to the input signal, and sends processed image data to a memory controller 14.

The memory controller 14 writes the input image data into a memory 19 through a bus 16, and sends image data written into the memory 19, through the bus 16 to an image compression processing section 17 or a resolution conversion processing section 18 for processing and records processed data into the memory 19, under the control of the central processing unit (CPU) 15. The memory controller 14 also sends image data processed by the signal processing section 13 or image data processed by the image compression processing section 17 or the resolution conversion processing section 18, if necessary, and recorded in the memory 19 to a display-signal processing section 20 through the bus 16, and reads the image data through the bus 16 and outputs to a drive 23.

The CPU 15 controls the operation of the digital camera 1. The CPU 15 receives a reference timing signal from a synchronization-signal generation section 31, described later, and generates control signals for controlling the operations of the signal processing section 13, the memory controller 14, and the display-signal processing section 20 and outputs them.

The image compression processing section 17 applies compression encoding (software encoding) to received image data according to a predetermined compression encoding method, such as JPEG. The resolution conversion processing section 18 applies horizontal or vertical image-resolution conversion processing to received data.

The display-signal processing section 20 receives image data recorded in the memory 19, through the bus 16, and converts the image data to a signal suited when it is output to a display section 21 and displayed, or to a signal suited when it is output to an external unit through a video output interface 22, according to a reference signal generated by a synchronization-signal generation section 31 disposed inside the display-signal processing section 20. The reference signal generated by the synchronization-signal generation section 31 is sent to the CCD camera section 11, to the signal processing section 13, and to the CPU 15.

The display section 21 is formed, for example, of a liquid crystal panel, and displays image data having a predetermined display format (such as that of the NTSC or PAL system), sent from the display-signal processing section 20. The video-output interface 22 is connected to an external unit by a predetermined interface form, and outputs to the external unit, image data having a predetermined display format (such as that of the NTSC or PAL system), sent from the display-signal processing section 20. The video-output interface 22 may be connected to the external unit by wire or by radio.

The memory controller 14 is connected to the drive 23, if necessary. A magnetic disk 41, an optical disk 42, a magneto-optical disk 43, or a semiconductor memory 44 is mounted to the drive 23. By the processing of the memory controller 14, for example, an image compressed by the image compression processing section 17 is sent and recorded in one of the above-described recording media.

In image capturing, a signal input from the CCD camera section 11 is converted to a digital signal by the A/D conversion section 12, and input to the signal processing section 13. The signal processing section 13 applies processing, such as gamma processing and processing for converting an RGB signal to Y/Cb/Cr signals, to the input signal, and sends processed image data to the memory controller 14. When the image size is changed, the image data is sent to the resolution conversion processing section 18 through the bus 16 by the processing of the memory controller 14, horizontal and vertical image conversion is executed, and converted data is recorded in the memory 19 through the bus 16 by the processing of the memory controller 14.

When the image data is recorded in a recording medium mounted to the drive 23, the image data is sent to the image compression processing section 17 through the bus 16 by the processing of the memory controller 14, and compressed by a predetermined compression encoding method, such as JPEG. The compressed image data is output to the drive 23 and recorded in the recording medium, such as the magnetic disk 41, the optical disk 42, the magneto-optical disk 43, or a semiconductor memory 44, by the processing of the memory controller 14.

When moving pictures are captured, the image signal captured by the CCD camera section 11 and processed by the A/D conversion section 12 and the signal processing section 13 is recorded in the memory 19 in units of frames by the processing of the memory controller 14. The memory controller 14 is controlled by the CPU 15, and sends the image signal recorded in the memory 19 to the image compression processing section 17. The image compression processing section 17 compresses the received image signal according to the frame-rate specification (for example, 15 frames/second or 16.6 frames/second) of the moving pictures. More specifically, the image compression processing section 17 compresses the received image signal to images each having 66.6 milliseconds when the frame-rate specification is 15 frames/second, or compresses the received image signal to images each having 60 milliseconds when the frame-rate specification is 16.6 frames/second. The compressed image data is written into the memory 19 or a recording medium mounted to the drive 23, by the processing of the memory controller 14.

The timing reference used in the above-described processing is a vertical synchronization signal VD generated by the synchronization-signal generation section 31 of the display-signal processing section 20. This signal is input to the CPU 15 and to the signal processing section 13, and serves as the reference for necessary signal processing and the processing of the CPU 15.

Conventionally, this reference timing (vertical synchronization signal VD) is generated based on the frame rate of the format (for example, the format of the NTSC or PAL system) of the video signal output from the video output interface.

In many cases, the liquid-crystal panel of the display section 21 used for the liquid-crystal viewfinder has 240 scanning lines according to the NTSC system. In digital still cameras which use such a liquid-crystal panel and operate according to the PAL system, the scanning lines are thinned out to display images on the liquid-crystal panel.

When PAL images are displayed on a liquid-crystal panel having scanning lines according to the NTSC system, since the scanning lines are thinned out, the image quality deteriorates. In such a case, if on-screen-display (OSD) character information is included in a display content, a part of characters may be missing due to thinning out of the scanning lines.

As the performance of CCDs, image capturing devices, has advanced these days, it is demanded that a frame rate and image quality be improved when moving pictures are displayed. As described above, in the conventional digital camera 1, the vertical synchronization signal VD generated according to the format of a video output serves as the processing reference. Therefore, the CCD camera section 11, the signal processing section 13, and the CPU 15 operate at timing based on the NTSC or PAL system according to the format of the video output.

When the processing reference is based on the NTSC or PAL system, however, it is not preferred that the two formats be used in terms of commercial products. In addition, a need to process image data having different frame rates when moving pictures are captured should be avoided. Therefore, in conventional digital cameras, image processing is performed at a PAL frame rate of 25 frames/second, which is the lower frame rate. Even in NTSC operations, images are processed at a frame rate of 25 frames/second. In other words, a high frame rate cannot be implemented.

When a compressed file of a moving picture is generated by software by the processing of the image compression processing section 17, it is difficult to synchronize images with sound at a frequency of 29.97 Hz based on the NTSC system. Therefore, when the image compression processing section 17 actually performs encoding by software, a frame rate (such as 15 frames/second, 16.6 frames/second, or 30 frames/second) which is not based on the NTSC system is used.

When the image compression processing section 17 performs encoding by software, since high compression with the use of motion vectors cannot be executed, the bit rate cannot be largely reduced and high image quality cannot be obtained.

When software processing is used for encoding, the same reference timing needs to be used both in capturing mode and reproduction mode.

To capture and record moving pictures with high quality, it is preferred that a special codec integrated circuit (IC) be used for encoding. In these days, many special codec ICs suited to capture and record moving pictures with high quality have been developed and made commercially available.

The already made commercially available codec ICs have been designed so as to operate in the NTSC or PAL system according to the conventional video output. When the codec ICs are used, since the cost increases, systems which allow a method in which software is used for high-frame-rate encoding and a method in which special codec ICs are used for high-image-quality encoding to be both used have been demanded. If both encoding methods can be used in a system, the system can handle either a video camera structured without a codec IC or a video camera structured with a codec IC, according to cost and quality requirements. Specifically, video cameras which can be connected to codec ICs can be structured.

SUMMARY OF THE INVENTION

The present invention has been made in consideration of the above-described situations. Accordingly, it is an object of the present invention to provide an image processing apparatus, an image processing method, a recording medium, and a program which allow both moving-picture encoding performed by high-frame-rate software and high-image-quality moving-picture encoding performed by an external codec IC, which perform reproduction processing at constant reference timing irrespective of the format of video-output moving images, and which eliminate the deterioration of the quality of displayed images.

The foregoing object is achieved in one aspect of the present invention through the provision of an image processing apparatus capable of outputting image data, including reference-signal generation means for generating a first reference signal and a second reference signal serving as processing-timing references; first acquisition means for acquiring image data; generation means for processing the image data acquired by the first acquisition means, according to timing determined by the first reference signal to generate image data having a first frame rate; conversion means for converting the image data having the first frame rate generated by the generation means to image data having a different frame rate; first output means for outputting image data having a second frame rate determined by the second reference signal, converted by the conversion means, to a first another image processing apparatus; and second output means for outputting image data having a third frame rate, converted by the conversion means, to a second another image processing apparatus.

The image processing apparatus may further include display means for displaying the image data having the second frame rate determined by the second reference signal, converted by the conversion means.

The second frame rate may be the frame rate of an image format processed by the first another image processing apparatus to which the image data is output by the first output means.

The third frame rate may be the frame rate of an image format processed by the second another image processing apparatus to which the image data is output by the second output means.

The image processing apparatus may be configured such that the second frame rate is the frame rate of a first image format processed by the first another image processing apparatus to which the image data is output by the first output means; the third frame rate is the frame rate of a second image format processed by the second another image processing apparatus to which the image data is output by the second output means; and the first frame rate is a frame rate not related to the first image format or the second image format.

The second frame rate may be the same as the third frame rate.

The image processing apparatus may be configured such that it further includes input means for receiving the input of the image data having the second frame rate from the first another image processing apparatus, and the conversion means further converts the image data having the second frame rate input by the input means to image data having the third frame rate.

The first another image processing apparatus, which receives the input of the image data having the second frame rate output from the first output means, may encode the image data output from the first output means, according to a predetermined image format.

The second another image processing apparatus, which receives the input of the image data having the third frame rate output from the second output means, may display the image data output from the second output means, according to a predetermined image format.

The image processing apparatus may further include encoding means for encoding the image data acquired by the acquisition means, by software processing at timing determined by the first reference signal.

The foregoing object is achieved in another aspect of the present invention through the provision of an image processing method for an image processing apparatus capable of outputting image data, including a reference-signal generation step of generating a first reference signal and a second reference signal serving as processing-timing references; an acquisition control step of controlling the acquisition of image data; a generation step of processing the image data of which the acquisition is controlled by the process of the acquisition control step, according to timing determined by the first reference signal to generate image data having a first frame rate; a conversion step of converting the image data having the first frame rate generated by the process of the generation step to image data having a different frame rate; a first output step of outputting image data having a second frame rate determined by the second reference signal, converted by the process of the conversion step, to a first another image processing apparatus; and a second output step of outputting image data having a third frame rate, converted by the process of the conversion step, to a second another image processing apparatus.

The foregoing object is achieved in yet another aspect of the present invention through the provision of a recording medium having recorded therein a computer-readable program for an image processing apparatus capable of outputting image data, the program including a reference-signal generation step of generating a first reference signal and a second reference signal serving as processing-timing references; an acquisition control step of controlling the acquisition of image data; a generation step of processing the image data of which the acquisition is controlled by the process of the acquisition control step, according to timing determined by the first reference signal to generate image data having a first frame rate; a conversion step of converting the image data having the first frame rate generated by the process of the generation step to image data having a different frame rate; a first output step of outputting image data having a second frame rate determined by the second reference signal, converted by the process of the conversion step, to a first another image processing apparatus; and a second output step of outputting image data having a third frame rate, converted by the process of the conversion step, to a second another image processing apparatus.

The foregoing object is achieved in still another aspect of the present invention through the provision of a computer-executable program for controlling an image processing apparatus capable of outputting image data, the program including a reference-signal generation step of generating a first reference signal and a second reference signal serving as processing-timing references; an acquisition control step of controlling the acquisition of image data; a generation step of processing the image data of which the acquisition is controlled by the process of the acquisition control step, according to timing determined by the first reference signal to generate image data having a first frame rate; a conversion step of converting the image data having the first frame rate generated by the process of the generation step to image data having a different frame rate; a first output step of outputting image data having a second frame rate determined by the second reference signal, converted by the process of the conversion step, to a first another image processing apparatus; and a second output step of outputting image data having a third frame rate, converted by the process of the conversion step, to a second another image processing apparatus.

In an image processing apparatus, an image processing method, a recording medium, and a program according to the present invention, a first reference signal and a second reference signal serving as processing-timing references are generated, image data is acquired, the acquired image data is processed according to timing determined by the first reference signal to generate image data having a first frame rate, the image data having the first frame rate is converted to image data having a different frame rate, converted image data having a second frame rate determined by the second reference signal is output to a first another image processing apparatus, and converted image data having a third frame rate is output to a second another image processing apparatus.

According to the present invention, acquired image data can be output at a predetermined frame rate.

In addition, according to the present invention, acquired image data can be processed at a frame rate not related to the output, and then, converted to image data having a frame rate suited for the output, and output. Therefore, both moving-picture encoding performed by software at a high frame rate and high-image-quality moving-picture encoding performed by an external codec IC can be executed.

Further, according to the present invention, image processing can be performed at constant timing irrespective of the format of video-output moving images, and the deterioration of the quality of a displayed image can be eliminated.

BRIEF DESCRIPTION OF THE DRAWINGS

FIG. 7 is a view showing the operation of D flip-flops.

FIG. 8 is a view showing the operation of selectors.

FIG. 9 is a view showing control signals used in image capturing.

FIG. 10 is a view showing control signals used in reproduction executed by the codec IC.

DESCRIPTION OF THE PREFERRED EMBODIMENTS

Figure 1:
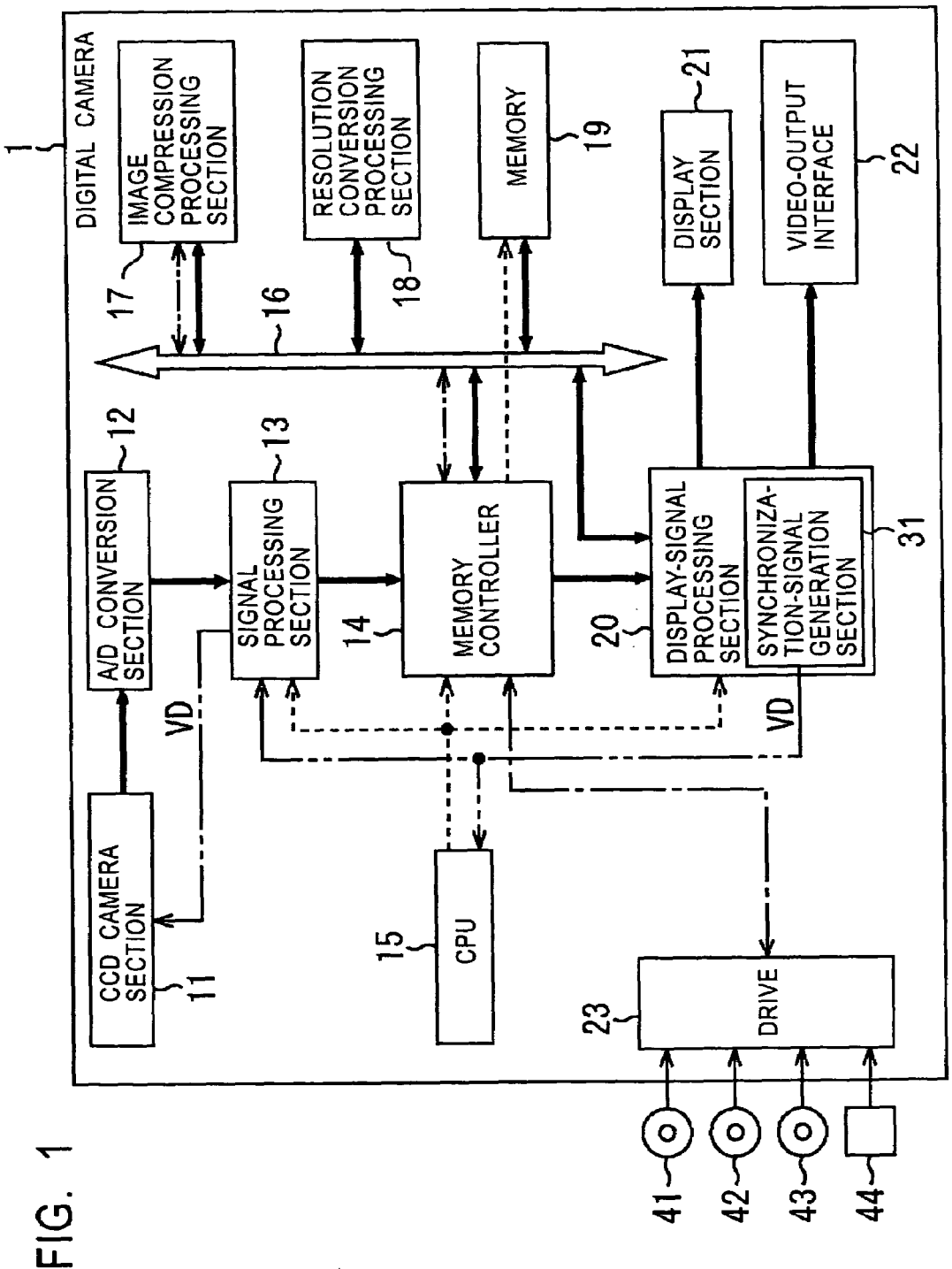
FIG. 1 is a block diagram showing the structure of a conventional digital camera.

An embodiment of the present invention will be described below by referring to the drawings.

Figure 2:
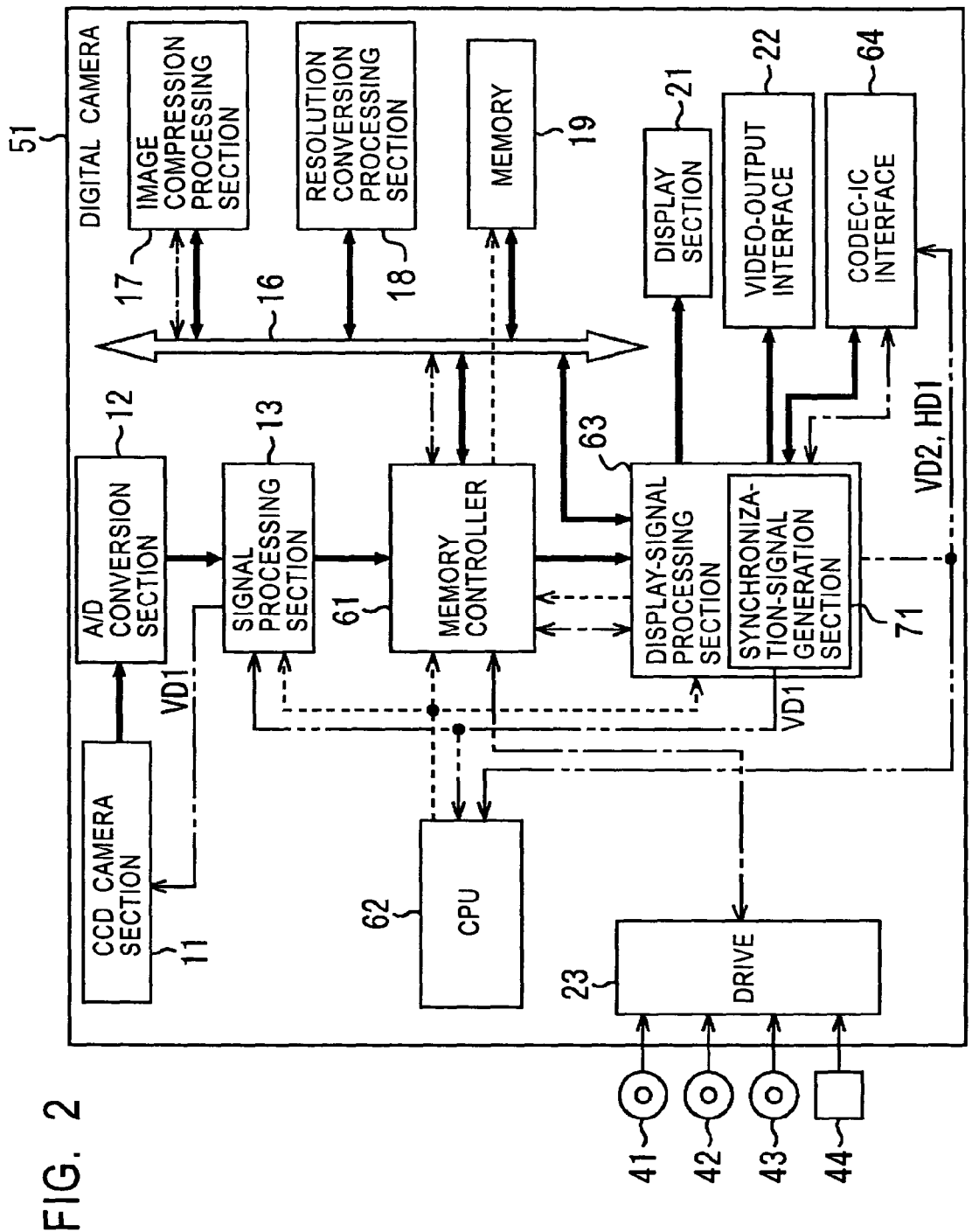
FIG. 2 is a block diagram showing the structure of a digital camera according to an embodiment of the present invention.

FIG. 2 is a block diagram showing the structure of a digital camera 51 according to an embodiment of the present invention.

In the present embodiment, the same symbols as those used in the conventional case are assigned to portions corresponding to those shown in the conventional case, and a description thereof is omitted, if unnecessary.

The digital camera 51 shown in FIG. 2 has basically the same structure as the digital camera 1 shown in FIG. 1 except that a memory controller 61 is provided instead of the memory controller 14, a CPU 62 is provided instead of the CPU 15, a display-signal processing section 63 having a synchronization-signal generation section 71 is provided in stead of the display-signal processing section 20 having the synchronization-signal generation section 31, and a codec-IC interface 64 is newly provided.

In the same way as in FIG. 1, also in FIG. 2, solid lines indicate image signal transfer, dotted lines indicate control-signal transfer, one-dot chain lines indicate code-signal transfer, and two-dot chain lines indicate synchronization-signal transfer.

The synchronization-signal generation section 71 generates a vertical synchronization signal VD1 serving as a first reference signal sent to a CCD camera section 11, a signal processing section 13, and the CPU 62, and in addition, generates a vertical synchronization signal VD2 and a horizontal synchronization signal HD1 serving as second reference signals sent to the CPU 62 and the codec-IC interface 64.

The vertical synchronization signal VD1 serving as the first reference signal corresponds to the vertical synchronization signal VD serving as the reference signal in the conventional case, but differs from it in that the vertical synchronization signal VD1 does not have a frequency based on the NTSC or PAL system used for an output video signal and does have a predetermined frequency such as 60 Hz or 120 Hz. The vertical synchronization signal VD2 and the horizontal synchronization signal HD1 serving as the second reference signals have frequencies based on the NTSC or PAL image format or others, and are sent to the CPU 62 and the codec-IC interface 64. It is assumed that the vertical synchronization signal VD1 has a field frequency of 60 Hz (frame frequency of 30 Hz).

The memory controller 61 writes input image data into a memory 19 through a bus 16, and, if necessary, sends image data recorded in the memory 19, through the bus 16 to an image compression processing section 17 or a resolution conversion processing section 18, under the control of the CPU 62. The memory controller 61 also sends image data recorded in the memory 19 (image data processed by the image compression processing section 17 or the resolution conversion processing section 18, if necessary) to the display-signal processing section 63 through the bus 16, and reads the image data through the bus 16 and outputs to a drive 23, under the control of the CPU 62. In these processes, the memory controller 61 records image data at a predetermined address in the memory 19 or reads image data at a predetermined address from the memory 19 according to an address setting signal sent from the CPU 62.

The memory controller 61 further outputs image data processed by a codec IC and input through the codec-IC interface 64 and the display-signal processing section 63, to the drive 23 and records it in a mounted recording medium.

The CPU 62 controls the operation of the digital camera 51. The CPU 62 receives reference timing signals (the vertical synchronization signal VD1 serving as the first reference signal and the vertical synchronization signal VD2 and the horizontal synchronization signal HD1 serving as the second reference signals) from the synchronization-signal generation section 71, and generates control signals for controlling the operations of the signal processing section 13, the memory controller 61, and the display-signal processing section 63 and outputs them, and generates the address setting signal for the memory 19 and outputs it to the memory controller 61.

The display-signal processing section 63 receives image data recorded in the memory 19, by the processing of the memory controller 61, and converts the image data to a signal suited when it is output to a display section 21 and displayed, to a signal suited when it is output to an external unit through a video output interface 22, or to a signal suited when it is output to the codec IC externally connected to the digital camera, according to reference signals generated by the synchronization-signal generation section 71 disposed inside the display-signal processing section 63. The display-signal processing section 63 also receives image data processed by the codec IC through the codec-IC interface 64, and outputs it to the memory 19 under the control of the memory controller 61.

The synchronization-signal generation section 71 generates, as reference signals, two types of signals, the vertical synchronization signal VD1 serving as the first reference signal, and the vertical synchronization signal VD2 and the horizontal synchronization signal HD1 serving as the second reference signals. As described above, the vertical synchronization signal VD1 serving as the first reference signal is sent to the CCD camera section 11, the signal processing section 13, and the CPU 62, and the vertical synchronization signal VD2 and the horizontal synchronization signal HD1 serving as the second reference signals are sent to the CPU 62 and the codec-IC interface 64.

The codec-IC interface 64 is an interface with the codec IC, not shown, externally connected to the digital camera 51, outputs image data sent from the display-signal processing section 63, to the codec IC, and receives image data processed by the codec IC and sends it to the display-signal processing section 63.

An image signal to which necessary processing has been applied is recorded in a magnetic disk 41, an optical disk 42, a magneto-optical disk 43, or a semiconductor memory 44 mounted to the drive 23, by the processing of the memory controller 61. In addition, a program recorded in the magnetic disk 41, the optical disk 42, the magneto-optical disk 43, or the semiconductor memory 44 mounted to the drive 23 is read and executed by the CPU 62, if necessary, or is recorded in the memory 19 by the processing of the memory controller 61 and read and executed by the CPU 62.

To increase the frame rate in the digital camera 51, it is necessary that image processing in the digital camera 51 be performed at a constant interval irrespective of the NTSC or PAL system used for a video output, the format of display images on the display section 21 be the same as the format of images handled by the codec IC, and only a video output conform to the NTSC or PAL system. When image processing in the digital camera 51 is performed at a constant interval irrespective of the NTSC or PAL system used for a video output, the frame rate of the image processing can be further increased, for example, as the performance of devices such as CCDs is improved, irrespective of the frame rate of output image data. In other words, processing such as software coding can be performed at a further higher frame rate.

In this case, since the display-signal processing section 63 can output an image signal for the same number of scanning lines as that in a liquid-crystal panel of the display section 21, problems such as image-quality deterioration and OSD partial character missing can be solved. In addition, when the digital camera 51 has such a structure, high-image-quality moving pictures can be recorded and reproduced irrespective of the format of a video output. Further, irrespective of whether the image format handled by the codec IC connected to the codec-IC interface 64 is the format of the NTSC or PAL system, the frame rate of a video output can be selected from those of the NTSC and PAL systems according to a unit connected to the video-output interface 22.

The operation of the digital camera 51 will be described next.

While images are being captured, the CCD camera section 11 and the signal processing section 13 receives the vertical synchronization signal VD1 serving as the first reference signal generated by the synchronization-signal generation section 71, and operates at the minimum interval corresponding to a field frequency of 60 Hz.

An image signal captured by the CCD camera section 11 is converted to a digital signal by an A/D conversion section 12, and input to the signal processing section 13. The signal processing section 13 applies processing, such as gamma processing and processing for converting an RGB signal to Y/Cb/Cr signals, to the input signal, and sends processed image data to the memory controller 61.

The memory controller 61 records the image data into the memory 19 through the bus 16 according to the control of the CPU 62. The memory controller 61 also sends image data recorded in the memory 19 through the bus 16 to the image compression processing section 17 or to the resolution conversion processing section 18 to process the image data and records the processed data in the memory 19, if necessary. The memory controller 61 further sends image data recorded in the memory 19 through the bus 16 to the display-signal processing section 63 according to the control of the CPU 62.

The image data sent to the memory controller 61 and recorded in the memory 19 or processed by the image compression processing section 17 or by the resolution conversion processing section 18 has a frame rate of 30 Hz according to the vertical synchronization signal VD1 serving as the first reference signal.

When input image data is displayed, the display-signal processing section 63 outputs to the display section 21 the image signal for the same number of scanning lines as that in the liquid-crystal panel constituting the display section 21. In other words, the display-signal processing section 63 converts input image data having a frame rate of 30 Hz to image data having a display format, and outputs the data.

When input image data is output from the video-output interface 22, the display-signal processing section 63 also converts the input image data having a frame rate of 30 Hz to image data having a frame rate conforming to an image format which can be handled by a unit connected to the video-output interface 22, and outputs the data to the outside from the video-output interface 22.

When input image data is output from the codec-IC interface 64 to the codec IC not shown, the display-signal processing section 63 converts the input image data having a frame rate of 30 Hz to image data having the frame rate of an image format which can be handled by the codec IC, and outputs the data to the codec-IC interface 64.

In reproduction processing performed by the codec IC, the display-signal processing section 63 receives reproduced image data having an image format which can be handled by the codec IC, from the codec-IC interface 64, and outputs the data to the memory 19 through the bus 16. The display-signal processing section 63 reads a reproduced image signal recorded in the memory 19 according to the address control of the memory controller 61, and outputs the signal to the display section 22 which can display images in the same image format or converts the image signal to an image signal having a frame rate conforming to an image format which can be handled by a unit connected to the video-output interface 22 and outputs the signal to the outside from the video-output interface 22.

Frame-rate conversion processing performed at image recording will be described by referring to FIG. 3 and FIG. 4.

Figure 3:
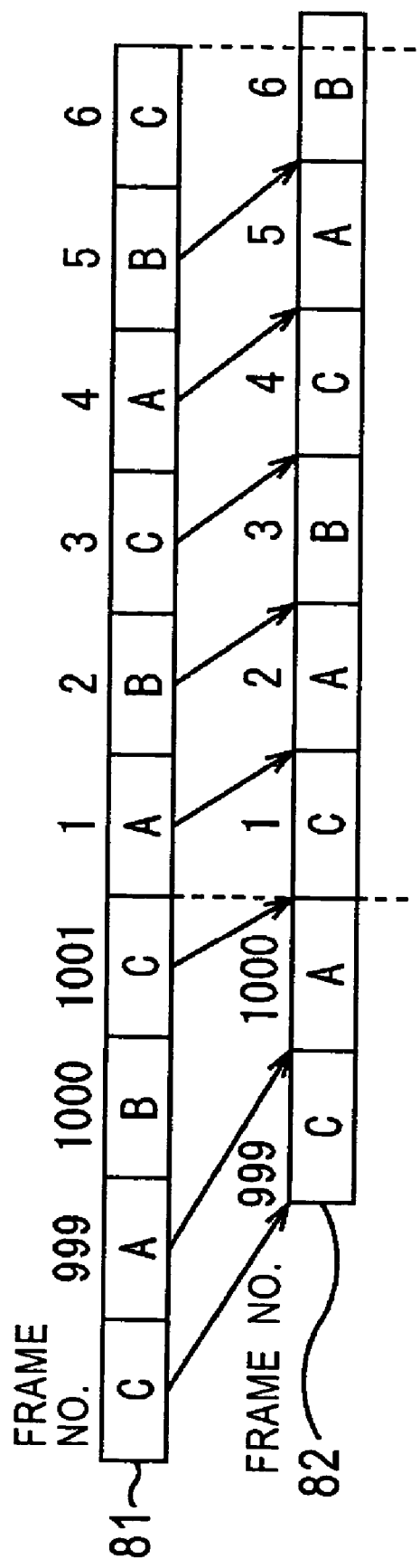
FIG. 3 is a view showing the relationship between 30-Hz frames and 29.97-Hz NTSC frames.

As shown in FIG. 3, 30-Hz frames 81 having a frame frequency of 30 Hz and generated by signal processing in the signal processing section 13 and 29.97-Hz frames 82 generated by the NTSC system have a frame-rate relationship of 1001:1000. Therefore, the display-signal processing section 63 thins one piece out of 1001 pieces of images having the 30-Hz frames 81 sent from the memory controller 61 to convert the 30-Hz frames 81 having a frame frequency of 30 Hz to the 29.97-Hz frames 82 having the frame rate of the NTSC system.

When the display format of the display section 21 and the format of image data which can be processed by the codec IC conform to the NTSC system, for example, the display-signal processing section 63 converts input 30-Hz frames 81 to 29.97-Hz frames 82 conforming to the NTSC system, and then, outputs to the codec-IC interface 64 or outputs to the display section 21 and displays there. In this case, as shown in FIG. 3, since the end time of the 1001-th frame of the 30-Hz frames 81 matches the end time of the 1000-th frame of the 29.97-Hz frames 82 conforming to the NTSC system, the 1000-th frame of the 30-Hz frames 81 is thinned out during conversion to the NTSC system and not displayed.

Figure 4:
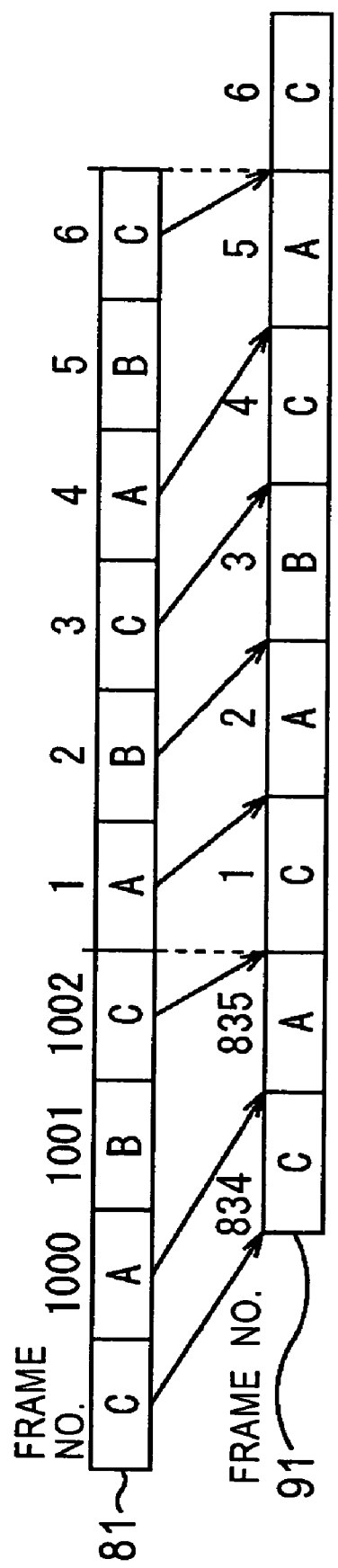
FIG. 4 is a view showing the relationship between 30-Hz frames and 25-Hz PAL frames.

In the same way, as shown in FIG. 4, since the 30-Hz frames 81 have a frame frequency of 30 Hz and 25-Hz frames 91 are generated by the PAL system, the display-signal processing section 63 thins one piece out of six pieces of images having the 30-Hz frames 81 sent from the memory controller 61 to convert the 30-Hz frames 81 having a frame frequency of 30 Hz to the 25-Hz frames 91 having the frame rate of the PAL system.

When the display format of the display section 21 and the format of image data which can be processed by the codec IC conform to the PAL system, for example, the display-signal processing section 63 converts input 30-Hz frames 81 to 25-Hz frames 91 conforming to the PAL system, and then, outputs to the codec-IC interface 64 or outputs to the display section 21 and displays there. In this case, as shown in FIG. 4, since the end time of the sixth frame of the 30-Hz frames 81 matches the end time of the fifth frame of the 25-Hz frames 91 conforming to the PAL system, the sixth frame of the 30-Hz frames 81 is thinned out during conversion to the PAL system and not displayed.

To avoid the occurrence of image jumping-over caused by thinning out in such conversion processing, the display-signal processing section 63 needs to have an area for temporarily storing at least three frame images (frames A, B, and C shown in FIG. 3 and FIG. 4).

Also when recorded image data is video-output from the video-output interface 22, since the input 30-Hz frames 81 can be converted to the 29.97-Hz frames 82 conforming to the NTSC system or to the 25-Hz frames 91 conforming to the PAL system by the same processing as that described by referring to FIG. 3 and FIG. 4, the display-signal processing section 63 can convert the input 30-Hz frames 81 to frames having the same frame rate as that of an image format which can be handled by a unit connected to the video-output interface 22 and output them from the video-output interface 22 to the outside.

With such conversion, even if the video output and the codec-IC processing have different formats, signals having suitable frame rates can be sent, and display processing can be performed at the frame rate corresponding to the number of scanning lines of the liquid-crystal panel used for display.

Figure 5:
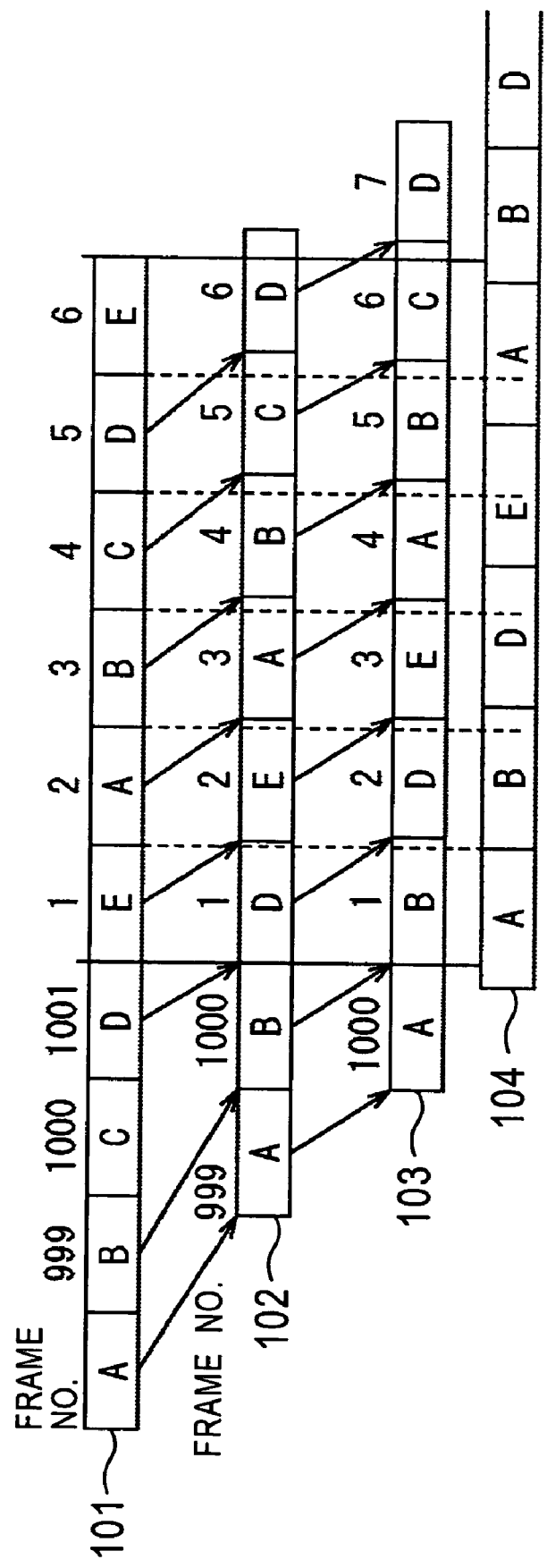
FIG. 5 is a view showing frame conversion executed by a codec IC during reproduction.

Conversion processing for reproduction, executed in the codec IC will be described next. FIG. 5 shows frame-rate conversion executed when the codec IC uses the NTSC system in reproduction mode and the video output conforms to the NTSC or PAL system. The operation of the digital camera 51 executed in this case will be described.

The CPU 62 controls the memory controller 61 such that addresses indicating planes of the memory 19, to which input images sent from the codec IC are recorded are specified in the order of frame A, frame B, frame C, frame D, and frame E according to the vertical synchronization signal VD1 serving as the first reference signal, that is, at an interval of 30 Hz. The specified addresses are latched at NTSC timing to determine actual addresses by the processing of the display-signal processing section 63. One actually-not-used address is generated in 1001 addresses specified at an interval of 30 Hz, and the plane corresponding to the address is skipped and an image is written into the next plane.

As shown in FIG. 5, the CPU 62 sets plane C at the 1000-th frame in CPU-specified frames 101, but plane C is skipped and an image is written into plane D after plane B in actual-writing planes 102. The actual-writing planes 102 are latched again at the frame rate of an actual video output to determine video-output planes (frames) as shown in video-output NTSC display planes 103 or in video-output PAL display planes 104.

When a video output sent from the video-output interface 22 conforms to the PAL system, since the codec IC uses the NTSC system (having a frame rate of 29.97 Hz) in the reproduction mode, the method reverse to that described by referring to FIG. 3 is applied, that is, one frame thinned out of 1001 frames is added to the output image data to have 30-Hz frames, and then, one frame is thinned out of six frames to have 25-Hz frames, which conform to the PAL system, as described by referring to FIG. 4.

When the codec IC uses the NTSC system in the reproduction mode and the video output sent from the video-output interface 22 conforms to the NTSC system, the display-signal processing section 63 needs to have a four-frame area for temporarily storing images for the processing to avoid image jumping over. In contrast, when the codec IC uses the NTSC system in the reproduction mode and the video output sent from the video-output interface 22 conforms to the PAL system, the display-signal processing section 63 needs to have a five-frame area for temporarily storing images for the processing to avoid image jumping over. Therefore, the display-signal processing section 63 needs to have a five-frame area for temporarily storing images to allow the video output sent from the video-output interface 22 to conform to either of the NTSC and PAL systems.

Figure 6:
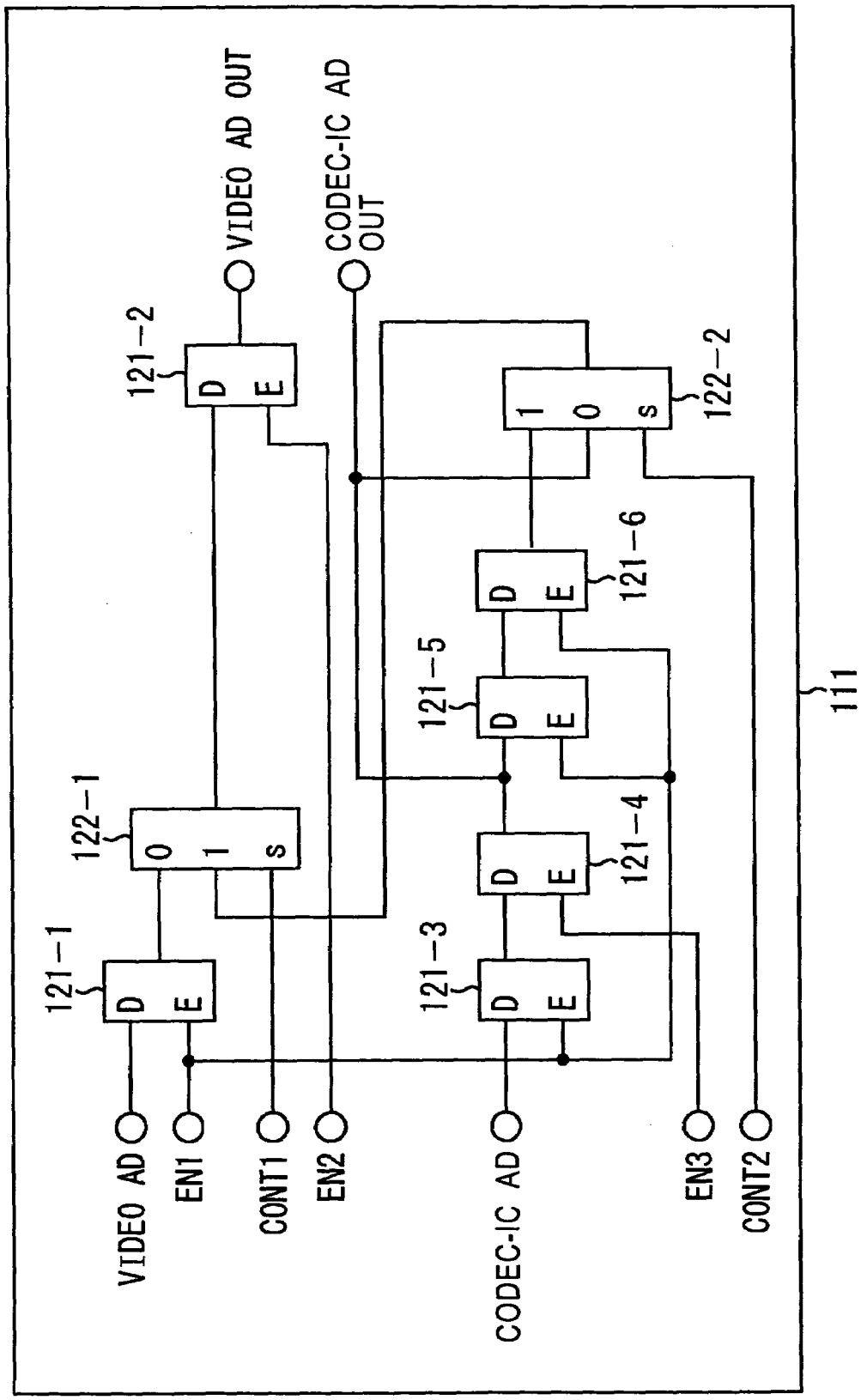
FIG. 6 is a view showing an example structure of a circuit for specifying a memory address.

FIG. 6 shows an example circuit structure for address setting in order to execute thinning-out processing. An address setting circuit 111 shown in FIG. 6 is formed of D flip-flops 121-1 to 121-6 having enable terminals and selectors 122-1 and 122-2. Its feature is the provision of the selector 122-1, serving as a selector for selecting from an address for the codec IC and an address for the video signal, in a circuit for generating a VIDEO AD signal to handle both video capturing and codec-IC reproduction. In FIG. 6, the clock input terminals of the flip-flops 121-1 to 121-6 and the selectors 122-1 and 122-2 are not shown.

FIG. 7 shows the truth tables of the flip-flops 121-1 to 121-6. The flip-flops 121-1 to 121-6 are D flip-flops which have enable terminals and output input data at a clock edge (for example, at the rising edge of an input clock).

FIG. 8 shows the truth tables of the selectors 122-1 and 122-2. The selectors 122-1 and 122-2 output the logic signals input to "0" input terminals when "L" (that is, "0") is input to S terminals (selector input terminals) and output the logic signals input to "1" input terminals when "H" (that is "1") is input to the S terminals.

Back to FIG. 6, the operation of the address setting circuit 111 will be described. When images are captured, the CPU 62 specifies the memory addresses of planes A, B, and C as VIDEO AD and CODEC-IC AD at an interval of 30 Hz. FIG. 9 shows video capturing modes and control signals. An enable (EN) signal EN1 has an interval of 30 Hz. An EN signal EN2 has an interval of 29.97 Hz when the video output conforms to the NTSC system or an interval of 25 Hz when the video output conforms to the PAL system. An EN signal EN3 has an interval of 29.97 Hz when codec-IC processing (codec mode) conforms to the NTSC system or an interval of 25 Hz when the codec-IC processing (codec mode) conforms to the PAL system.

In the circuit shown in FIG. 6, VIDEO AD is input to the flip-flop 121-1, and EN1 is given as an EN signal. The output of the flip-flop 121-1 is input to the "0" input terminal of the selector 122-1 in which CONT1 is input to the S terminal. During image capturing, CONT1 is "0". Therefore, the output of the selector 122-1 is equal to the output of the flip-flop 121-1, and CONT2 does not cause anything during image capturing. The output of the selector 122-1 is input to the flip-flop 121-2, and EN2 is given as an EN signal to the flip-flop 121-2. The output of the flip-flop 121-2 is output as VIDEO AD OUT, which is used by the memory controller 61 to set a video-output address.

CODEC-IC AD is input to the flip-flop 121-3, and EN1 is given as an EN signal. The output of the flip-flop 121-3 is input to the flip-flop 121-4 in which EN3 is given as an EN signal. The output of the flip-flop 121-4 is output as CODEC-IC AD OUT, which is used for setting a codec-IC address.

In the same way, in reproduction processing executed by the coded IC, the CPU 62 specifies the memory addresses of planes A, B, C, D and E as CODEC-IC AD at an interval of 30 Hz. FIG. 10 shows reproduction processing modes which uses the codec IC and control signals. An EN signal EN1 has an interval of 30 Hz. An EN signal EN2 has an interval of 29.97 Hz when the video output conforms to the NTSC system or an interval of 25 Hz when the video output conforms to the PAL system. An EN signal EN3 has an interval of 29.97 Hz when the codec mode conforms to the NTSC system or an interval of 25 Hz when the codec mode conforms to the PAL system.

In the circuit shown in FIG. 6, CODEC-IC AD is input to the flip-flop 121-3, and EN1 is given as an EN signal. The output of the flip-flop 121-3 is input to the flip-flop 121-4 in which EN3 is given as an EN signal. The output of the flip-flop 121-4 is output as CODEC-IC AD OUT, which is used for setting a codec-IC address, to the "0" input terminal of the selector 122-2 in which CONT2 is input to the S terminal and also to the flip-flop 121-5 in which EN1 is given as an EN signal. The output of the flip-flop 121-5 is input to the flip-flop 121-6 in which EN1 is given as an EN signal.

The output of the flip-flop 121-6 is input to the "1" input terminal of the selector 122-2 in which CONT2 is input to the S terminal. When the video output and the codec mode of the codec IC conform to different systems, CONT2 is "1". Therefore, the output of the selector 122-2 is equal to the output of the flip-flop 121-6. The address indicated by the output of the selector 122-2 is acquired when the latest address obtained when the codec IC finishes writing is converted to an address for 30-Hz frames.

The output of the selector 122-2 is input to the "1" input terminal of the selector 122-1. Since CONT1 is "1" during reproduction processing which uses the codec IC, the output of the selector 122-2 is output from the selector 122-1. The output of the selector 122-1 is input to the flip-flop 121-2 where EN2 is given as an EN signal. The output of the flip-flop 121-2 is output as VIDEO AD OUT, which is used by the memory controller 61 to set a video-output address.

When the video output and the codec mode of the codec IC conform to an identical systems, CONT2 is "0". Therefore, the output of the selector 122-2 is equal to the output of the flip-flop 121-4. The output of the selector 122-2 is output from the selector 122-1. The output of the selector 122-1 is input to the flip-flop 121-2 where EN2 is given as an EN signal. The output of the flip-flop 121-2 is output as VIDEO AD OUT, which is used by the memory controller 61 to set a video-output address.

Frame-rate conversion for each video output type in the above-described frame-rate conversion processing, executed when the codec mode of the codec IC and the display format of the display section 21 conform to the NTSC system will be described below by referring to FIG. 11 to FIG. 14. In FIG. 11 to FIG. 14, the portions other than the memory 19, the display-signal processing section 63, the display section 21, the video-output interface 22, and the codec-IC interface 64 are omitted.

Figure 11:
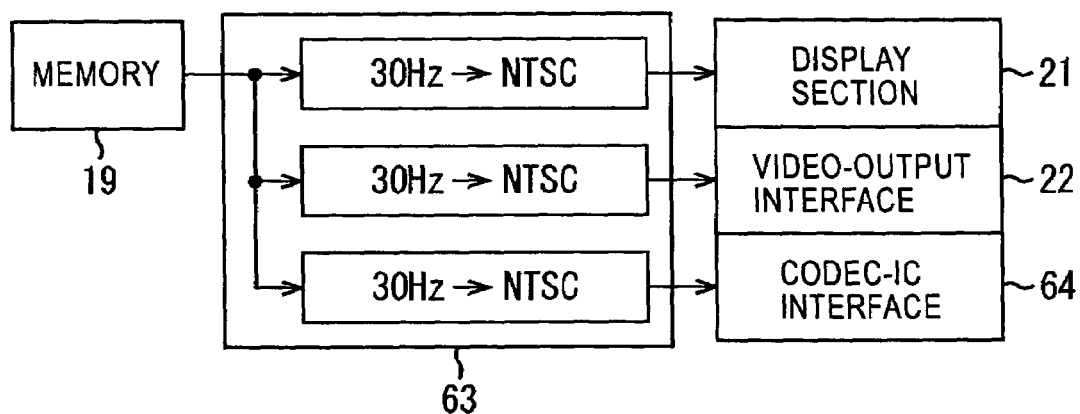
FIG. 11 is a view showing an operation of a display-signal processing section shown in FIG. 2.

In image-data recording processing performed when the video output conforms to the NTSC system, as shown in FIG. 11, the display-signal processing section 63 receives image data having a frame rate of 30 Hz recorded in the memory 19, through the bus 16, converts the image to an image having a frame rate of 29.97 Hz, which conforms to the NTSC system, by the above-described conversion method, and outputs it to the display section 21, the video-output interface 22, and the codec-IC interface 64.

Figure 12:
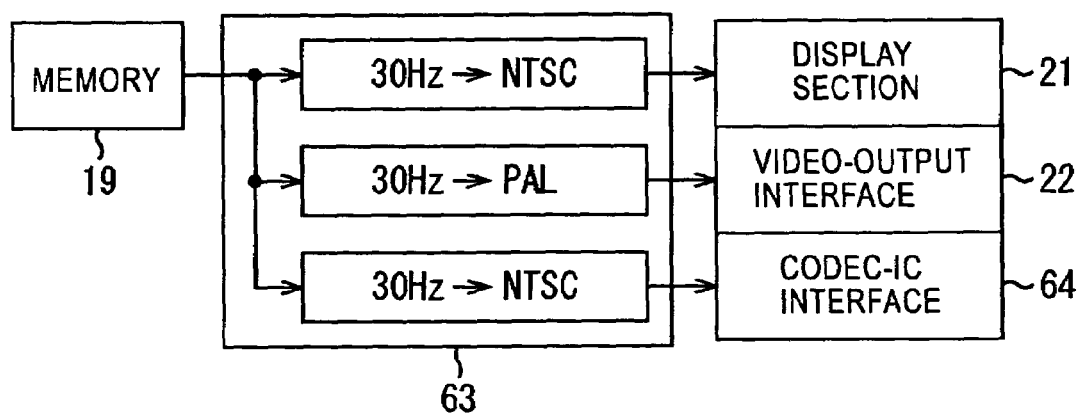
FIG. 12 is a view showing an operation of the display-signal processing section shown in FIG. 2.

In image-data recording processing performed when the video output conforms to the PAL system, as shown in FIG. 12, the display-signal processing section 63 receives image data having a frame rate of 30 Hz recorded in the memory 19, through the bus 16, converts the image to an image having a frame rate of 29.97 Hz, which conforms to the NTSC system, by the above-described conversion method, and outputs it to the display section 21 and the codec-IC interface 64. The display-signal processing section 63 also converts the image to an image having a frame rate of 25 Hz, which conforms to the PAL system, by the above-described conversion method, and outputs it to the video-output interface 22.

Figure 13:
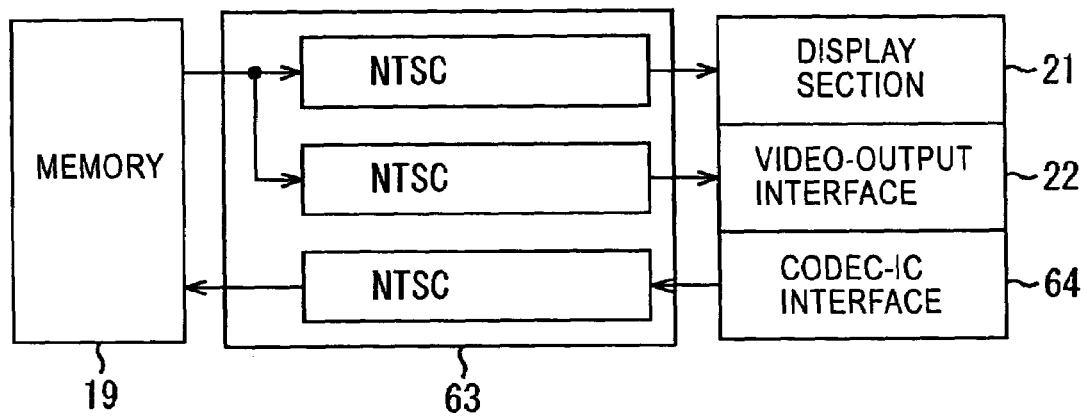
FIG. 13 is a view showing an operation of the display-signal processing section shown in FIG. 2.

In reproduction processing which uses the codec IC, performed when the video output conforms to the NTSC system, as shown in FIG. 13, the display-signal processing section 63 receives NTSC image data having a frame rate of 29.97 Hz from the codec-IC interface 64. The NTSC image data is written in the memory 19 through the bus 16 by the processing of the memory controller 61. The display-signal processing section 63 receives the NTSC image data having a frame rate of 29.97 Hz written in the memory 19, and outputs the image data as is to the display section 21 and the video-output interface 22 without conversion.

Figure 14:
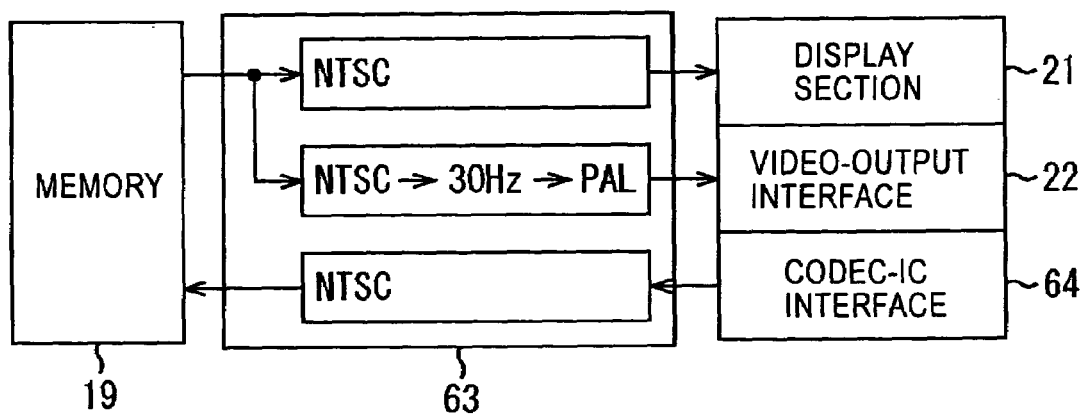
FIG. 14 is a view showing an operation of the display-signal processing section shown in FIG. 2.

In reproduction processing which uses the codec IC, performed when the video output conforms to the PAL system, as shown in FIG. 14, the display-signal processing section 63 receives NTSC image data having a frame rate of 29.97 Hz from the codec-IC interface 64. The NTSC image data is written in the memory 19 through the bus 16 by the processing of the memory controller 61. The display-signal processing section 63 receives the NTSC image data having a frame rate of 29.97 Hz written in the memory 19, and outputs the data as is to the display section 21. The display-signal processing section 63 also converts the NTSC image data having a frame rate of 29.97 Hz to image data having a frame rate of 30 Hz, then converts it to PAL image data having a frame rate of 25 Hz, and outputs it to the video-output interface 22.

As described above, during image capturing and reproduction, processing is performed at predetermined timing (such as at an interval of 60 Hz) not related to the frame rate of the output format, and frame-rate conversion of image data to the NTSC or PAL system can be performed according to the output format. Therefore, motion pictures having a high frame rate can be captured irrespective of the video output mode, and further, recording and reproduction using a codec IC is made possible.

In addition, since image-data capturing and processing such as software coding can be designed such that they are performed at predetermined timing, such as at an interval of 30 Hz, irrespective of a video output mode in video capturing and reproduction, software design becomes easy and cost can be reduced.

Further, when the processing format of the codec IC conforms to the NTSC system, for example, it is assumed that the number of scanning lines of the liquid-crystal panel constituting the display section 21 conforms to the NTSC system, and a signal conforming to the NTSC system needs to be always displayed on the display section 21. Therefore, images can be output without any image-quality deterioration such as OSD missing.

The series of processing described above can also be implemented by software. A program constituting the software is installed from a recording medium into a computer built in special hardware, or into a unit which can execute various functions by installing various programs, such as a general-purpose personal computer.

The recording medium can be one of package media distributed separately from the computer to provide the user with the program and having recorded the program therein, such as the magnetic disk 41 (including a floppy disk), the optical disk 42 (including a compact disc read-only memory (CD-ROM) and a digital versatile disk (DVD)), the magneto-optical disk 43 (including Mini-Disk (trademark, MD), or the semiconductor memory 44, as shown in FIG. 1 and FIG. 2.

In the present specification, the steps describing the program recorded in a recording medium include processing performed in a time-sequential manner in the described order, and also include processing executed in parallel or separately even if it is not necessarily processed in a time-sequential manner.

What is claimed is:

1. An image processing apparatus capable of outputting image data, comprising:
   reference-signal generation means for generating a first reference signal and a second reference signal serving as processing-timing references;
   first acquisition means for acquiring image data;
   generation means for processing the image data acquired by the first acquisition means, according to timing determined by the first reference signal to generate image data having a first frame rate;
   conversion means for converting the image data having the first frame rate generated by the generation means to image data having a different frame rate;
   first output means for outputting image data having a second frame rate determined by the second reference signal, converted by the conversion means, to a first another image processing apparatus;
   second output means for outputting image data having a third frame rate, converted by the conversion means, to a second another image processing apparatus; and
   input means for receiving an input of the image data having the second frame rate from the first another image processing apparatus,
   wherein the conversion means further converts the image data having the second frame rate input by the input means to image data having the third frame rate.

2. An image processing apparatus according to claim 1, further comprising display means for displaying the image data having the second frame rate determined by the second reference signal, converted by the conversion means.

3. An image processing apparatus according to claim 1, wherein the second frame rate is the frame rate of an image format processed by the first another image processing apparatus to which the image data is output by the first output means.

4. An image processing apparatus according to claim 1, wherein the third frame rate is the frame rate of an image format processed by the second another image processing apparatus to which the image data is output by the second output means.

5. An image processing apparatus according to claim 1, wherein the second frame rate is the frame rate of a first image format processed by the first another image processing apparatus to which the image data is output by the first output means; the third frame rate is the frame rate of a second image format processed by the second another image processing apparatus to which the image data is output by the second output means; and the first frame rate is a frame rate not related to the first image format or the second image format.

6. An image processing apparatus according to claim 1, wherein the second frame rate is the same as the third frame rate.

7. An image processing apparatus according to claim 1, wherein the first another image processing apparatus, which receives the input of the image data having the second frame rate output from the first output means, encodes the image data output from the first output means, according to a predetermined image format.

8. An image processing apparatus according to claim 1, wherein the second another image processing apparatus, which receives the input of the image data having the third frame rate output from the second output means, displays the image data output from the second output means, according to a predetermined image format.

9. An image processing apparatus according to claim 1, further comprising encoding means for encoding the image data acquired by the acquisition means, by software processing at timing determined by the first reference signal.

10. An image processing method for an image processing apparatus capable of outputting image data, comprising:
    a reference-signal generation step of generating a first reference signal and a second reference signal serving as processing-timing references;
    an acquisition control step of controlling the acquisition of image data;
    a generation step of processing the image data of which the acquisition is controlled by the process of the acquisition control step,
    according to timing determined by the first reference signal to generate image data having a first frame rate;
    a conversion step of converting the image data having the first frame rate generated by the process of the generation step to image data having a different frame rate;
    a first output step of outputting image data having a second frame rate determined by the second reference signal, converted by the process of the conversion step, to a first another image processing apparatus;
    a second output step of outputting image data having a third frame rate, converted by the process of the conversion step, to a second another image processing apparatus; and
    an input step for receiving an input of the image data having the second frame rate from the first another image processing apparatus,
    wherein the conversion step further converts the image data having the second frame rate input by the input step to image data having the third frame rate.

11. A recording medium having recorded therein a computer-readable program for an image processing apparatus capable of outputting image data, the program comprising:
    a reference-signal generation step of generating a first reference signal and a second reference signal serving as processing-timing references;
    an acquisition control step of controlling the acquisition of image data;
    a generation step of processing the image data of which the acquisition is controlled by the process of the acquisition control step, according to timing determined by the first reference signal to generate image data having a first frame rate;
    a conversion step of converting the image data having the first frame rate generated by the process of the generation step to image data having a different frame rate;
    a first output step of outputting image data having a second frame rate determined by the second reference signal, converted by the process of the conversion step, to a first another image processing apparatus;
    a second output step of outputting image data having a third frame rate, converted by the process of the conversion step, to a second another image processing apparatus; and
    an input step for receiving an input of the image data having the second frame rate from the first another image processing apparatus,
    wherein the conversion step further converts the image data having the second frame rate input by the input step to image data having the third frame rate.

12. A computer-executable program recorded on a computer-readable medium for controlling an image processing apparatus capable of outputting image data, the program comprising:

a reference-signal generation step of generating a first reference signal and a second reference signal serving as processing-timing references;

an acquisition control step of controlling the acquisition of image data; a generation step of processing the image data of which the acquisition is controlled by the process of the acquisition control step, according to timing determined by the first reference signal to generate image data having a first frame rate;

a conversion step of converting the image data having the first frame rate generated by the process of the generation step to image data having a different frame rate;

a first output step of outputting image data having a second frame rate determined by the second reference signal, converted by the process of the conversion step, to a first another image processing apparatus;

a second output step of outputting image data having a third frame rate, converted by the process of the conversion step, to a second another image processing apparatus; and an input step for receiving an input of the image data having the second frame rate from the first another image processing apparatus, wherein the conversion step further converts the image data having the second frame rate input by the input step to image data having the third frame rate.

* * * * *